(12) United States Patent
Ji et al.

(10) Patent No.: US 9,258,743 B2
(45) Date of Patent: Feb. 9, 2016

(54) RESOURCE SCALING IN WIRELESS COMMUNICATION SYSTEMS

(75) Inventors: Tingfang Ji, San Diego, CA (US);
Alexei Gorokhov, San Diego, CA (US);
Pranav Dayal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 244 days.

(21) Appl. No.: 12/260,908

(22) Filed: Oct. 29, 2008

(65) Prior Publication Data

US 2009/0116389 A1    May 7, 2009

Related U.S. Application Data

(60) Provisional application No. 60/984,694, filed on Nov. 1, 2007.

(51) Int. Cl.
| | | |
|---|---|---|
| *H04J 1/16* | (2006.01) | |
| *H04W 28/16* | (2009.01) | |
| *H04W 28/18* | (2009.01) | |

(52) U.S. Cl.
CPC .............. *H04W 28/16* (2013.01); *H04W 28/18* (2013.01)

(58) Field of Classification Search
None
See application file for complete search history.

(56) References Cited

U.S. PATENT DOCUMENTS

| | | | |
|---|---|---|---|
| 5,956,327 A | 9/1999 | Faerber et al. | |
| 6,112,092 A | 8/2000 | Benveniste | |
| 6,223,041 B1 | 4/2001 | Egner et al. | |
| 7,072,663 B2 | 7/2006 | Ramos et al. | |
| 7,158,796 B2 | 1/2007 | Tiedemann, Jr. et al. | |
| 7,272,118 B1 | 9/2007 | Yarkosky | |
| 7,376,437 B2 * | 5/2008 | Molkdar et al. | 455/522 |
| 7,567,529 B1 * | 7/2009 | Yarkosky | 370/328 |

(Continued)

FOREIGN PATENT DOCUMENTS

| | | |
|---|---|---|
| CN | 1244318 A | 2/2000 |
| EP | 0802695 A2 | 10/1997 |

(Continued)

OTHER PUBLICATIONS

Dorot, V., et al., "An Explanatory Dictionary of Modern Computer Terms," 2nd Edition, bhv, Saint Petersburg, 2001, 'Program Product' on p. 339.

(Continued)

*Primary Examiner* — Kibrom T Hailu
(74) *Attorney, Agent, or Firm* — Nerrie M. Zohn

(57) ABSTRACT

Systems and methodologies are described that facilitate resource scaling for inter-access point fairness in a wireless communication system. As described herein, an offered load of an access point can be determined based on one or more loading metrics relating to associated terminals, throughput, data rate, quality of service (QoS), or the like. Based on the determined offered load of an access point, resources used by the access point and/or power utilized for communication over those resources can be scaled based on a comparison of the offered load of the access point to a nominal or default offered load. Centralized techniques for resource scaling are described herein, wherein one or more centralized controllers coordinate resource scaling with respective access points via backhaul messaging. In addition, distributed techniques for resource scaling are described herein, wherein neighboring access points communicate with each other via over-the-air messaging to determine a local optimal resource apportionment.

32 Claims, 12 Drawing Sheets

(56) References Cited

U.S. PATENT DOCUMENTS

| | | | |
|---|---|---|---|
| 7,822,064 B2* | 10/2010 | Thubert et al. | 370/468 |
| 7,979,078 B2 | 7/2011 | Tiedemann et al. | |
| 2002/0098847 A1 | 7/2002 | Benveniste | |
| 2003/0017837 A1* | 1/2003 | Kalliojarvi | 455/522 |
| 2004/0127259 A1 | 7/2004 | Matsunaga | |
| 2005/0111462 A1 | 5/2005 | Walton et al. | |
| 2006/0098609 A1* | 5/2006 | Henderson et al. | 370/338 |
| 2006/0099954 A1* | 5/2006 | Henderson et al. | 455/447 |
| 2006/0285503 A1 | 12/2006 | Mese et al. | |
| 2007/0072645 A1* | 3/2007 | Clark et al. | 455/561 |
| 2007/0142064 A1 | 6/2007 | Gutowski | |
| 2007/0155431 A1* | 7/2007 | Munzner et al. | 455/560 |
| 2007/0207828 A1 | 9/2007 | Cheng et al. | |
| 2007/0218905 A1* | 9/2007 | Lee | 455/436 |
| 2007/0218910 A1* | 9/2007 | Hill et al. | 455/445 |
| 2008/0102877 A1* | 5/2008 | Suemitsu et al. | 455/522 |
| 2008/0151833 A1* | 6/2008 | Natarajan | 370/331 |

FOREIGN PATENT DOCUMENTS

| | | |
|---|---|---|
| EP | 1760954 A1 | 3/2007 |
| GB | 2382503 | 5/2003 |
| JP | 10013926 A | 1/1998 |
| JP | 2007074718 A | 3/2007 |
| KR | 20060035521 A | 4/2006 |
| WO | WO2007026054 | 3/2007 |
| WO | 2007039513 A1 | 4/2007 |

OTHER PUBLICATIONS

International Search Report & Written Opinion—PCT/US2008/081885, International Search Authority—European Patent Office—May 19, 2009.

Translation of Office Action in Russian application 2010122071 corresponding to U.S. Appl. No. 12/260,908, citing V_L_Dorot_pgs_399_year_2001, EP0802695A2 ,US20070207828, GB2382503 and WO2007026054 dated Apr. 28, 2011.

Taiwan Search Report—TW097142137—TIPO—Feb. 21, 2012.

\* cited by examiner

RESOURCE SCALING IN WIRELESS COMMUNICATION SYSTEMS

CROSS-REFERENCE

This application claims the benefit of U.S. Provisional Application Ser. No. 60/984,694, filed Nov. 1, 2007, and entitled "RESOURCE SCALING IN WIRELESS COMMUNICATION SYSTEMS," the entirety of which is incorporated herein by reference.

BACKGROUND

I. Field

The present disclosure relates generally to wireless communications, and more specifically to techniques for scheduling resources in a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

Wireless communication networks, such as cellular networks, can be constructed as an ad hoc network of one or more wireless terminals and one or more wireless access points, each of which can be fixed or mobile. In the event that multiple access points are located in a common local area (e.g., within the communication range of a common terminal), signals communicated by a serving access point for a terminal can be subject to interference from signals communicated by other access points in the local area. In turn, this interference can lower the quality of service (QoS) associated with signals communicated to the terminal.

Traditionally, QoS requirements for a wireless communication network are enforced through resource scheduling mechanisms at respective access points. For example, resource scheduling can be conducted at an access point by randomly selecting resources to be utilized by the access point at a given time. However, it would be desirable to implement one or more resource control mechanisms for a wireless communication network that provide at least further reduced interference and/or increased QoS for multiple access points located in a common local area.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method for apportioning resources in a wireless communication system is described herein. The method can comprise determining relative loading of respective access points in a communication system; and scaling resources used by at least one of the respective access points for communication as a function of the determined relative loading of the respective access points.

According to another aspect, a wireless communications apparatus is described herein that can comprise a memory that stores data relating to offered loads of respective base stations. The wireless communications apparatus can further comprise a processor configured to apportion resources utilized by at least one of the respective base stations based at least in part on the offered loads of the respective base stations.

Yet another aspect relates to an apparatus that facilitates resource scaling in a wireless communication system. The apparatus can comprise means for determining a nominal offered load associated with respective access points; and means for scheduling resources for use by one or more of the respective access points as a function of the nominal offered load.

Still another aspect relates to a computer program product, which can comprise a computer-readable medium that includes code for determining an offered load of an access point in a wireless communication system; code for determining a nominal offered load associated with the wireless communication system; and code for scaling resources utilized by the access point as a function of the offered load of the access point in relation to the nominal offered load.

A further aspect relates to an integrated circuit that executes computer-executable instructions for enforcing fair use of resources in a wireless communication network. The instructions can comprise identifying a nominal loading factor associated with a communication network; determining loading of a base station in the communication network; and constraining communication by the base station a subset of resources utilized by the communication network, wherein size of the subset is based on the loading of the base station in proportion to the nominal loading factor associated with the communication network.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
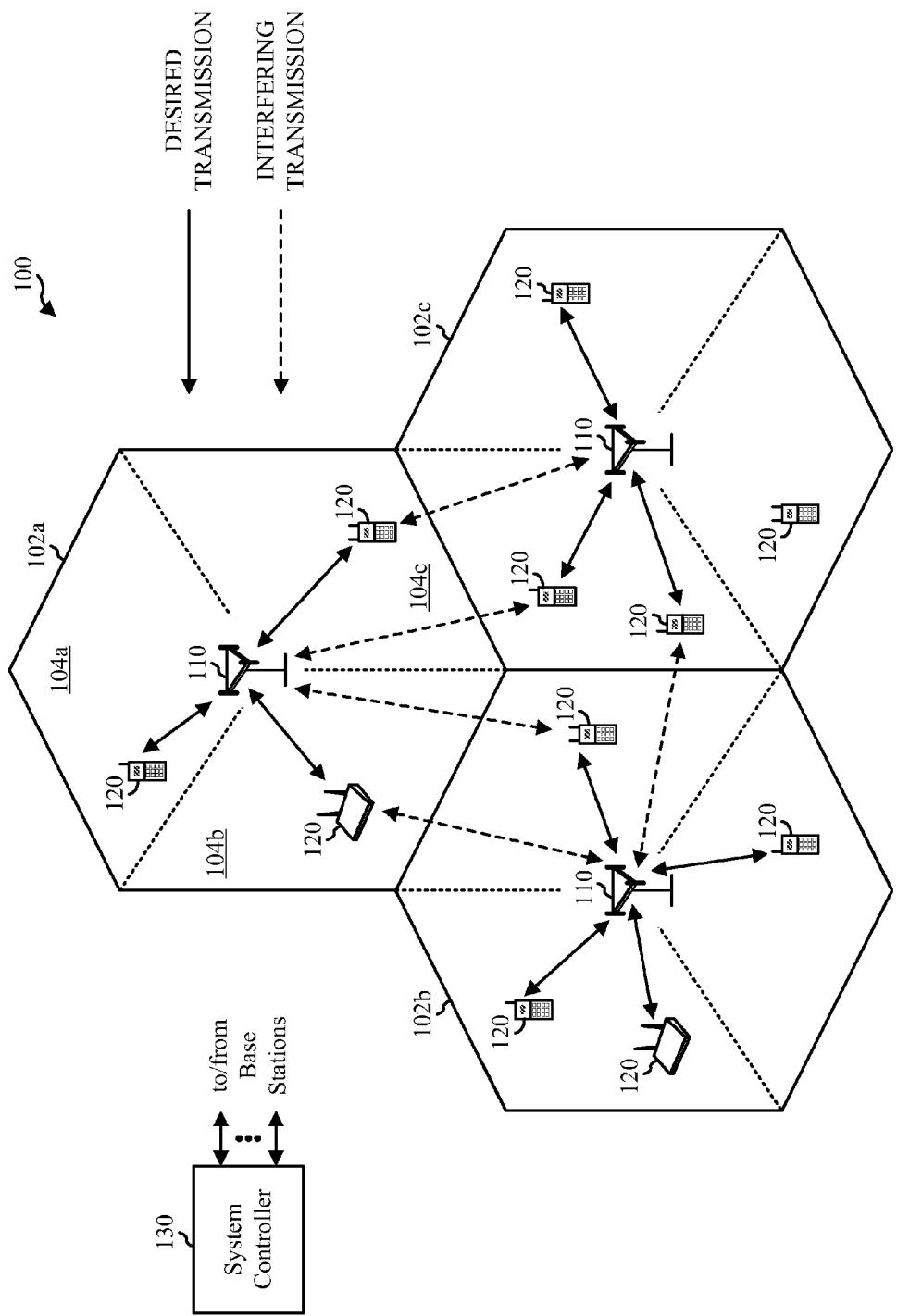
FIG. 1 illustrates a wireless multiple-access communication system in accordance with various aspects set forth herein.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 is an illustration of a wireless multiple-access communication system 100 in accordance with various aspects. In one example, the wireless multiple-access communication system 100 includes multiple base stations 110 and multiple terminals 120. Further, one or more base stations 110 can communicate with one or more terminals 120. By way of non-limiting example, a base station 110 can be an access point, a Node B (e.g., an Evolved Node B or eNB), and/or another appropriate network entity. Each base station 110 provides communication coverage for a particular geographic area 102. As used herein and generally in the art, the term "cell" can refer to a base station 110 and/or its coverage area 102 depending on the context in which the term is used.

To improve system capacity, the coverage area 102 corresponding to a base station 110 can be partitioned into multiple smaller areas (e.g., areas 104a, 104b, and 104c). Each of the smaller areas 104a, 104b, and 104c can be served by a respective base transceiver subsystem (BTS, not shown). As used herein and generally in the art, the term "sector" can refer to a BTS and/or its coverage area depending on the context in which the term is used. Further, as used herein and generally in the art, the term "cell" can also be used to refer to the coverage area of a BTS depending on the context in which the term is used. In one example, sectors 104 in a cell 102 can be formed by groups of antennas (not shown) at base station 110, where each group of antennas is responsible for communication with terminals 120 in a portion of the cell 102. For example, a base station 110 serving cell 102a can have a first antenna group corresponding to sector 104a, a second antenna group corresponding to sector 104b, and a third antenna group corresponding to sector 104c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell.

In accordance with one aspect, terminals 120 can be dispersed throughout the system 100. Each terminal 120 can be stationary or mobile. By way of non-limiting example, a terminal 120 can be an access terminal (AT), a mobile station, user equipment (UE), a subscriber station, and/or another appropriate network entity. A terminal 120 can be a wireless device, a cellular phone, a personal digital assistant (PDA), a wireless modem, a handheld device, or another appropriate device. Further, a terminal 120 can communicate with any number of base stations 110 or no base stations 110 at any given moment.

In another example, the system 100 can utilize a centralized architecture by employing a system controller 130 that can be coupled to one or more base stations 110 and provide coordination and control for the base stations 110. In accordance with alternative aspects, system controller 130 can be a single network entity or a collection of network entities. Additionally, the system 100 can utilize a distributed architecture to allow the base stations 110 to communicate with each other as needed. In one example, system controller 130 can additionally contain one or more connections to multiple networks. These networks can include the Internet, other packet based networks, and/or circuit switched voice networks that can provide information to and/or from terminals 120 in communication with one or more base stations 110 in system 100. In another example, system controller 130 can include or be coupled with a scheduler (not shown) that can schedule transmissions to and/or from terminals 120. Alternatively, the scheduler can reside in each individual cell 102, each sector 104, or a combination thereof.

As further illustrated by FIG. 1, each sector 104 in system 100 can receive "desired" transmissions from terminals 120 in the sector 104 as well as "interfering" transmissions from terminals 120 in other sectors 104. The total interference observed at a given sector 104 can include both intra-sector interference from terminals 120 within the same sector 104 and inter-sector interference from terminals 120 in other sectors 104. In one example, intra-sector interference can be substantially eliminated using OFDMA transmission from the terminals 120, which ensures orthogonality between transmissions of different terminals 120 in the same sector 104. Inter-sector interference, which is also known in the art as other sector interference (OSI), can result when transmissions in one sector 104 are not orthogonal to transmissions in other sectors 104.

Figure 2:
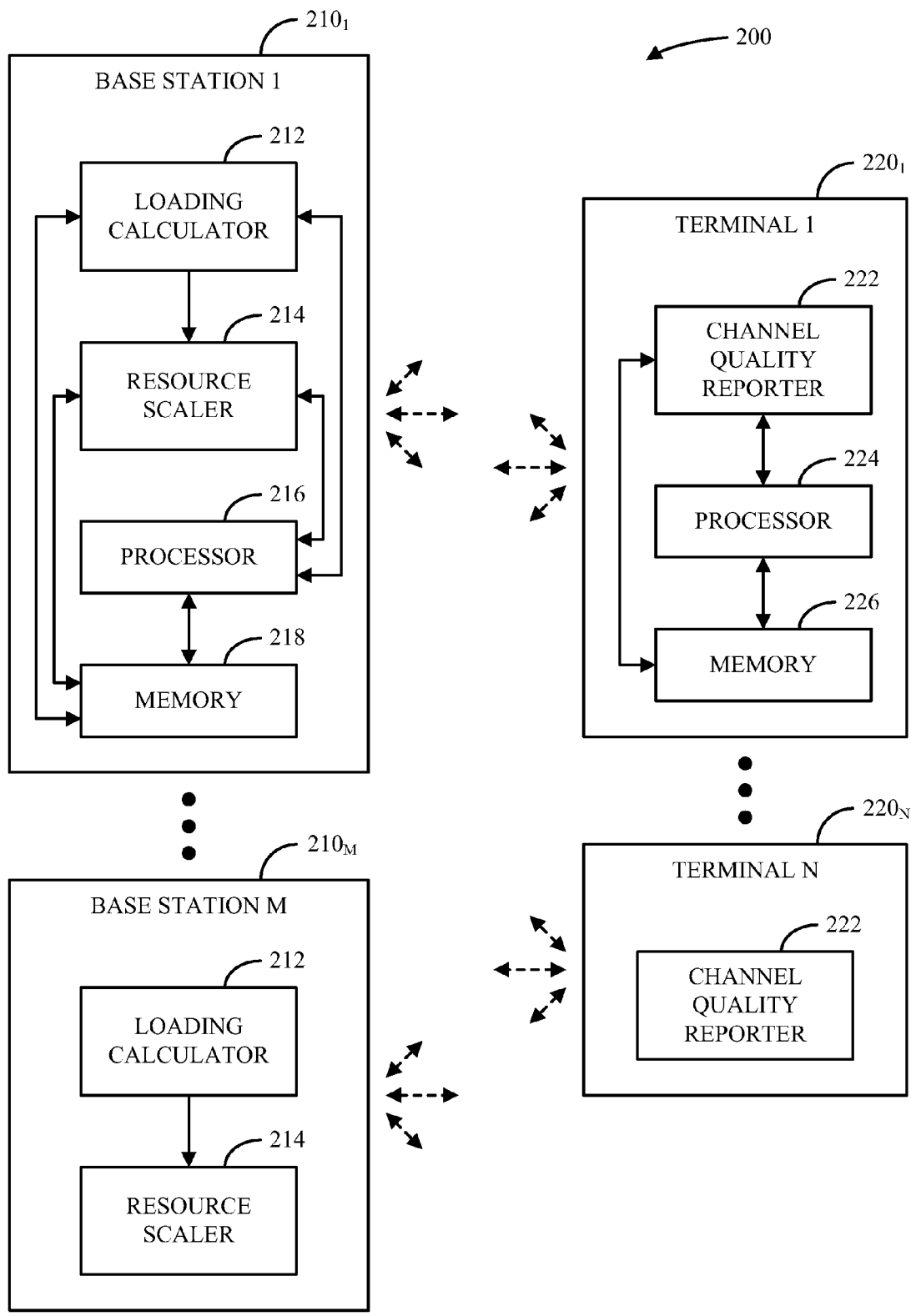
FIG. 2 is a block diagram of a system for resource scaling in a wireless communication system in accordance with various aspects.

FIG. 2 is a block diagram of a system 200 for resource scaling in a wireless communication system in accordance with various aspects provided herein. As FIG. 2 illustrates, system 200 can include one or more base stations 210 and one or more terminals 220. As used in FIG. 2 and herein, the number of base stations 210 in system 200 is referred to as M and the number of terminals 220 in system 200 is referred to as N. It should be appreciated that M and N can be any appropriate number, which can be equal or different. In another example, respective base stations 210 and terminals 220 in system 200 can communicate with one or more other base stations 210 and/or terminals 220 in system 200 via one or more antennas (not shown) associated therewith.

In accordance with one aspect, base stations 210 and terminals 220 in system 200 can be deployed in an ad hoc manner to form a wireless communication network. This network can be arranged into cells, sectors, and/or other suitable geographical areas in a manner similar to that illustrated by FIG. 1 or otherwise. In one example, as a result of an ad hoc deployment of base stations 210 and terminals 220 within system 200, multiple base stations 210 can be located in a common local area. For example, multiple base stations 210 can be located within the communication range of a single terminal 220. In such an example, a terminal 220 can communicate with one or more designated "serving" base stations 210 and/or other terminals 220 over one or more communication channels. Accordingly, signals communicated by other, or "non-serving," base stations 210 and/or other terminals 220 can interfere with signals communicated to or from the terminal 220. This interference can in turn cause a loss in the signal-to-noise ratio (SNR) achieved at the terminal 220 and/or the overall channel quality (e.g., QoS) observed by the terminal 220.

To satisfy minimum QoS requirements for terminals in a wireless communication system and to mitigate the effects of interference on overall system communication quality, base stations traditionally utilize various resource scheduling mechanisms. For example, in one such resource scheduling mechanism, a base station randomly selects a portion of resources to be utilized for transmission at a given time. By transmitting on only a randomly selected subset of the total available system resources, there is a smaller likelihood that transmissions from two neighboring base stations will utilize the same set of resources and interfere with one another. However, as this selection is random, it can be appreciated that resource subsets selected by neighboring base stations can overlap, resulting in high interference and low SNR on the overlapping portions of the selected resource subsets.

Alternatively, frequency reuse can be utilized, wherein neighboring base stations utilize predefined subsets of the overall system resources that are selected such that no two neighboring base stations utilize the same predefined resource subset. Accordingly, traditional frequency reuse minimizes inter-sector interference by ensuring that no two neighboring base stations transmit on overlapping sets of resources. However, because the resource subsets scheduled for respective base stations in a frequency reuse pattern are predefined and often uniform in size, traditional frequency reuse can unfairly limit the throughput of base stations with a relatively high amount of loading as compared to neighboring base stations 210.

In view of the above, a base station 210 in system 200 can implement an improved resource scaling and scheduling mechanism in accordance with various aspects described herein. In one example, a base station 210 in system 200 can employ a loading calculator 212, a resource scaler 214, and/or any other suitable means to apportion and schedule system resources among base stations 210 based on relative loading, thereby achieving the resource allocation fairness of traditional random selection, the improved signal quality of traditional frequency reuse, and/or other such benefits. Accordingly, system 200 can enable equalization of the resources available for a terminal 220. In addition, system 200 can enable equalization of QoS flows across different base stations 210, which can potentially have drastically different offered loads.

In one example, the total system resources available to base stations 210 and terminals 220 in system 200 can be grouped into resource sets, which can be characterized by sets of orthogonal dimensions (e.g., time, frequency, code, space, etc.). Additionally and/or alternatively, the resource sets can be characterized by one or more power measures, such as power and/or power spectrum density (PSD) at a transmitter and/or receiver. In accordance with one aspect, a loading calculator 212 can determine the relative loading of an associated base station 210, based on which a resource scaler 214 can apportion one or more resource sets to the base station 210 based on its relative loading. By doing so, the loading calculator 212 and resource scaler 214 enable a tradeoff of dimensions for an increase in signal quality. While loading calculators 212 and resource scalers 214 are illustrated in system 200 as located at respective base stations 210, it should be appreciated that the loading calculators 212 and/or resource scalers 214 can alternatively be stand-alone entities within system 200 and/or associated with any other suitable entity in system 200, such as one or more terminals 220. In one example, a loading calculator 212 and/or resource scaler 214 associated with a given base station 210 can be implemented by, or leverage the functionality of, a processor 216 and/or memory 218. While processors 216 and memories 218 are omitted from some base stations 210 in FIG. 2 for brevity, it should be appreciated that any base station 210 in system 200 can incorporate and utilize such components.

In accordance with one aspect, a loading calculator 212 at a base station 210 can be utilized to determine an offered load of the base station 210. Subsequently, a resource scaler 214 can be utilized to scale the number of resource sets used by the base station 210 and/or the power or PSD over the resource sets used by the base station 210 in proportion to the determined offered load. In one example, the resource scaler 214 can utilize any suitable mapping (e.g., linear, super-linear, sub-linear, etc.) to apportion system resources and/or power as a function of offered load.

In accordance with another aspect, a loading calculator 212 can characterize the offered load of an associated base station 210 based on one or more loading metrics. These metrics can include, but are not limited to, the number of active terminals 220 served by the base station 210; the number of terminals 220 served by a base station 210 relative to an average or median number of terminals 210 served by a base station 210 in the local area (e.g., the base station 210 and one or more first-tier neighbors and/or a larger local area); the downlink and/or uplink buffer size at the base station 210 and/or a terminal 220 served by the base station 210, respectively; the total data rate reserved by the base station 210 for high QoS traffic; or the like. In one example, based on the characterized offered load of a base station 210, an associated resource scaler 214 can apportion system resources utilized by the base station 210 in order to ensure fair use of the system resources among neighboring base stations 210.

In one example, resource apportionment performed by a resource scaler 214 can be utilized in combination with frequency reuse to ensure that neighboring base stations 210 do not utilize overlapping sets of system resources. As a result, signal quality within system 200 can be improved by both mitigating the effects of interference within system 200 and ensuring fair use of system resources between respective base stations 210. For example, if a terminal 220 has a serving base station 210 and one or more other base stations 210 are present from which the terminal 220 can also receive a strong signal, resource scalers 214 at the respective base stations 210 can apportion the resources used by the base stations 210 such that the serving base station 210 does not use any resources utilized by the other base stations 210.

In accordance with one aspect, the offered load of respective base stations 210 as determined by respective loading calculators 212 can be normalized by an average network loading, a median network loading, and/or another network loading measure. In one example, data relating to average network loading can be collected via backhaul messages between base stations 210 and corresponding base station controllers (not shown) and/or other appropriate network entities and/or via over-the-air messages between base stations 210 and/or terminals 220.

In accordance with another aspect, respective terminals 220 in system 200 can include a channel quality reporter 222 that observes present signal quality factors and reports the observed factors to a serving base station 210 for the terminal 220 and/or one or more other base stations 210 and/or terminals 220. While system 200 illustrates that channel quality reporters 222 are located at respective terminals 220, it should be appreciated that channel quality reporters 222 can alternatively be associated with any other appropriate network entity or entities and/or provided in system 200 as one or more standalone entities. In addition, it should be appreciated that channel quality reporters 222 can additionally and/or alternatively be associated with respective base stations 210 for conveying signal quality data observed at the respective base stations 210 to respective terminals 220 and/or other base stations 210. In addition, a channel quality reporter 222 can be implemented by or leverage the functionality of a processor 224 and/or memory 226 associated with a terminal 220. While a processor 224 and memory 226 are omitted from some terminals 220 in FIG. 2 for brevity, it should be appreciated that any terminal 220 in system 200 can incorporate such components.

In one example, a channel quality reporter 222 can relay over-the-air messages to a serving base station 210 and/or one or more neighboring base stations 210. These over the air messages can include interference management indications and/or other suitable information. For example, an over-the-air message generated by a channel quality reporter 222 can include an other sector interference bit (e.g., F-OSI) for reverse link interference management. As another example, a message generated by the channel quality reporter 222 can include information relating to interference observed on multiple dimensions within the resources used by system 200. In another example, a base station 210 can receive channel quality data from terminals 220 not served by the base station 220 in one or more backhaul messages. For example, a backhaul message provided to a base station 210 can include active set management messages from terminals 220 served by neighboring base stations 210. In an additional example, a base station 210 can send direct load messages to neighboring base stations 210 and/or terminals 220.

In accordance with one aspect, resource scalers 214 associated with respective base stations 210 can apportion resource sets between base stations 210 such that resource set usage is normalized by a nominal resource set usage. In one example, a default resource usage level (e.g., 50%) can be configured at respective base stations 210 to correspond to a given offered load in system 200. Alternatively, the nominal resource set usage can be determined by one or more base stations 210 and/or other network entities based on a variety of factors, such as channel quality reports given by respective channel quality reporters 222, base station capacity, or the like. In one example, resource usage can additionally and/or alternatively be scaled as a function of available backhaul bandwidth in system 200.

By way of specific, non-limiting example, a loading calculator 212 and/or resource scaler 214 can be utilized to apportion resources for a given base station 210 as follows. First, for a fixed resource set size, the number of active (e.g., usable) resource sets in each base station 210 in system 200 can be given by the following:

$$N_i = \rho M, \quad (1)$$

where M is the total number of resource sets in system 200, $\rho$ is a nominal loading factor, and $N_i$ is the number of terminals 220 served by the base station 210.

In an additional specific example, to provide for fairness between base stations 210, system resources can be scaled as follows. The number of active resource sets in an i-th base station 210, herein denoted as $M_i$, can initially be scaled according to the total number of terminals 220 served by the base station 210 as follows:

$$M_i = \min\left(M, \rho M \frac{N_i}{\bar{N}}\right), \quad (2)$$

where $\bar{N}$ is the average number of terminals 220 per base station 210 in the local area. In one example, the local area can be defined as a set of neighboring base stations 210, whose identities can be discovered via a centralized or distributed mechanism, as described in further detail infra. Further, it can be appreciated that resource set scaling as given by Equation (2) can result in a lower loading factor than the intended loading factor for a given base station 210 due to the minimization utilized in Equation (2). As additionally provided by Equation (2), $M_i$ out of M total resource sets can be chosen for an i-th base station 210. These resource sets can be chosen in a random or systemic fashion or in any other suitable manner. In addition, reuse geometry over respective active resource sets can be computed for each terminal 220 served by the base station 210. In one example, interference from inactive base stations 210 can be set to zero in the above calculations.

In accordance with one aspect, a resource scaler 212 can utilize information such as QoS, data rate, throughput per user, and other factors and/or requirements associated with respective terminals 220 in determining a resource scaling. For example, the terms $N_i$ and/or $\rho$ as used in Equation (2) can take into account other metrics, such as a number of high QoS flows, a number of terminals 220 with substantially identical QoS and/or other requirements, aggregated data rate reservation, or the like. Additionally and/or alternatively, user terminals 220 served by a given base station 210 can be weighted based on their QoS during resource scaling. For example, low QoS users can be given a higher weighting than high QoS users. In another example, the nominal loading factor $\rho$ utilized by the resource scaler 214 can be an averaged loading factor over different base stations 210 in system 200, an optimal loading factor based on system bandwidth, a default loading factor, and/or any other suitable loading factor. In an additional example, resource apportionment as determined by the resource scaler 214 can alternatively be based on throughput such that a determined resource apportionment optimizes system throughput based on one or more performance metrics, such as local and/or global median throughput, maximum (e.g., peak) throughput, tail (e.g., worst case) throughput, or the like.

Figure 3:
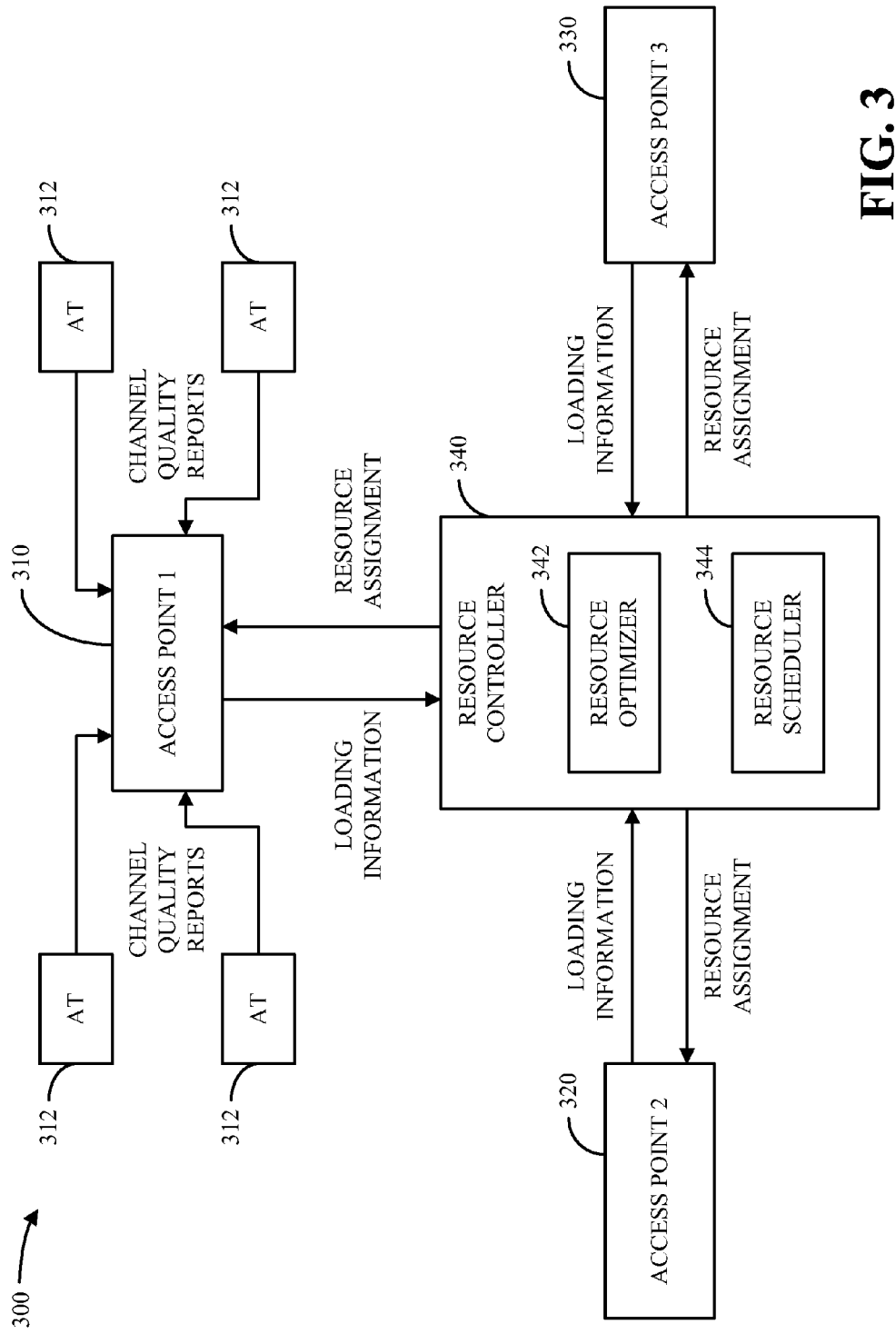
FIG. 3 is a block diagram of a system for centralized resource optimization and scheduling in accordance with various aspects.

Referring now to FIG. 3, a system 300 for centralized resource optimization and scheduling in accordance with various aspects described herein is illustrated. In one example, system 300 can include one or more access points (APs) 310, 320, and/or 330, which can utilize a centralized scheme for resource scaling as follows. In accordance with one aspect, APs 310, 320, and/or 330 can receive channel quality reports and/or other related data from respective associated access terminals (ATs) 312 and/or other entities w/in system 300. While only AP 310 is illustrated as having associated ATs 312 in FIG. 3 for brevity, it should be appreciated that any AP in system 300 can have associated ATs 312. Further, it should be appreciated that system 300 can include any number of APs 310, 320, and/or 330, which can respectively have any number of associated ATs 312.

In one example, based on channel quality reports from ATs 312 and/or other data, APs 310, 320, and/or 330 can report loading information and/or other suitable information to a centralized resource controller 340. Resource controller 340 can be a stand-alone entity in system 300 as illustrated by FIG. 3, or alternatively resource controller 340 can be implemented by an AP, a base station controller, and/or any other suitable network entity within system 300. Additionally and/or alternatively, the functionality of resource controller 340 can be distributed among a plurality of entities in system 300.

In accordance with one aspect, resource controller 340 can include a resource optimizer 342 that determines an optimal resource apportionment for associated APs 310, 320, and/or 330, and a resource scheduler 344 that communicates the determined apportionment back to APs 310, 320, and/or 330. In one example, resource optimizer 342 can optimize the apportionment of resources within system 300 based on one or more optimization functions. For example, resource optimizer 342 can determine a resource allocation to maximize total system throughput, to maximize median system throughput, to maximize tail system throughput, to provide substantially equal AP performance, and/or to optimize system 300 in any other manner. One or more selected optimization functions can be considered by resource optimizer 342 as a multi-variable optimization problem that accepts information provided from APs 310, 320, and/or 330 as input, determines relative loading of APs 310, 320, and/or 330 from the input provided therefrom, and computes an optimal resource apportionment as output. In one example, resource optimizer 342 can utilize any suitable optimization technique to compute optimal resource allocations, such as linear or non-linear programming.

In accordance with another aspect, resource scheduler 344 can identify an optimal resource apportionment computed by resource optimizer 342 and communicate resource assignments to respective APs 310, 320, and/or 330 according to the computed apportionment. In one example, communication between APs 310, 320, and/or 330 and resource controller 340 can be conducted via backhaul messages, over-the-air messages, and/or any other suitable means.

Figure 4:
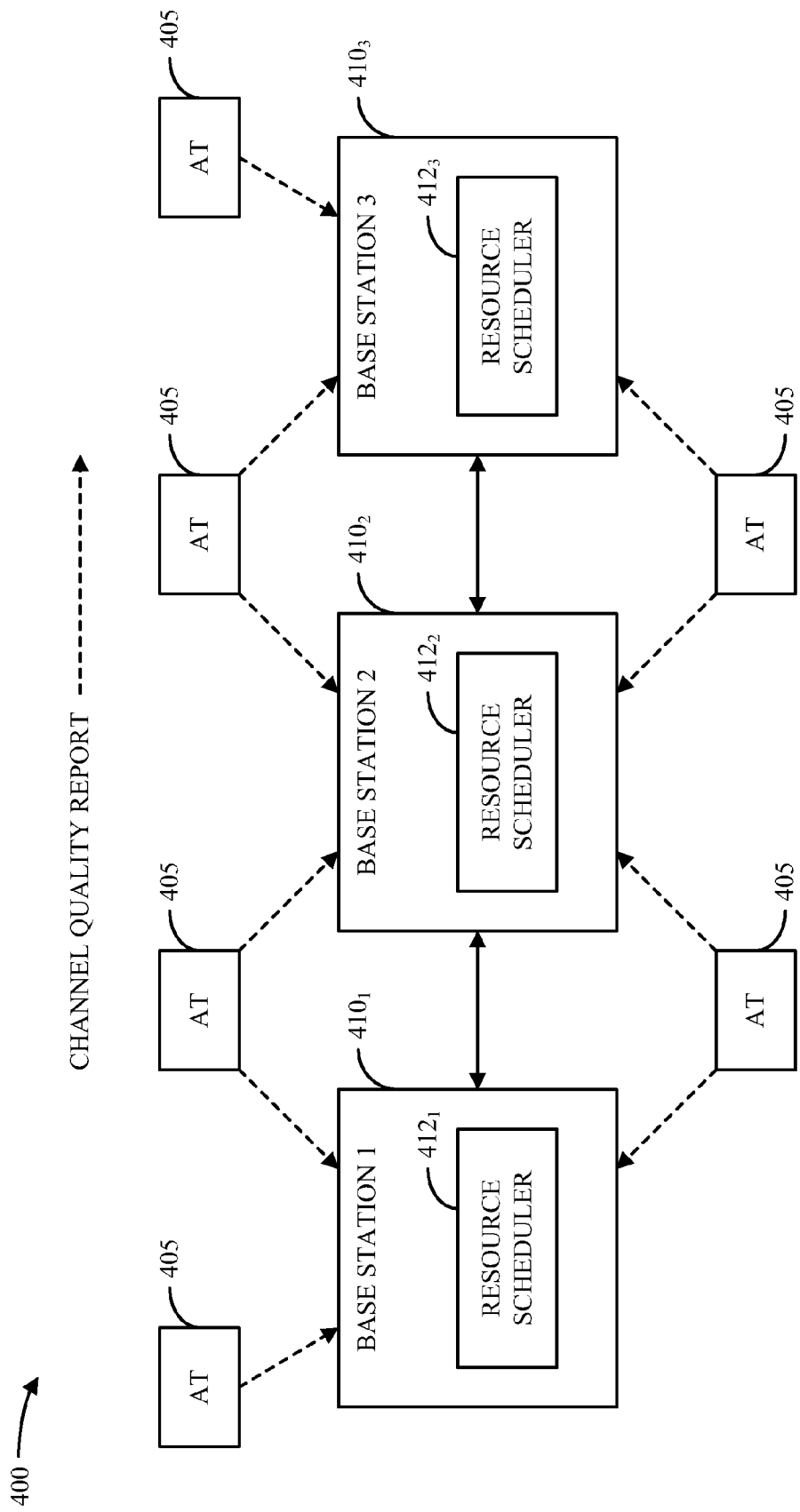
FIG. 4 is a block diagram of a system for distributed resource optimization and scheduling in accordance with various aspects.

Turning to FIG. 4, a system 400 for distributed resource optimization and scheduling is illustrated in accordance with various aspects. In one example, system 400 can include one or more base stations 410, which can be associated with one or more ATs 405. While FIG. 4 illustrates a system 400 with three base stations 410, it should be appreciated that system 400 can include any number of base stations 410. In accordance with one aspect, a base station 410 can determine its offered load by utilizing information relating to associated ATs 405. Offered load can be computed by a base station 410 based on various measures, such as a total number of served ATs 405, total throughput, or the like. In addition, an AT 405 can report information relating to channel quality to one or more base stations 410. In one example, an AT 405 can broadcast channel quality information to all base stations 410 within its communication range. Alternatively, an AT 405 can report channel quality information to its serving base station 410, which in turn can report that information to neighboring base stations 410.

In accordance with one aspect, each base station 410 in system 400 can gather information relating to the offered load of neighboring base stations 410 from the neighboring base stations 410 themselves and/or ATs served by the base stations 410. Upon gathering this information, a resource scheduler 412 at a base station 410 can apportion resources based on the offered load of the base station 410 associated with the resource scheduler 412 and the neighboring base stations 410 for which offered load information is received. In one example, a resource scheduler 412 can scale resources used by an associated base station 410 to ensure fairness between neighboring base stations 410. Additionally and/or alternatively, a resource scheduler 412 can coordinate resource usage such that resource sets utilized by neighboring base stations 410 do not overlap. Thus, it can be appreciated that distributed resource scaling, such as that illustrated by system 400, can enable neighboring base stations 410 to engage in a negotiation-like process to apportion system resources based on their relative loading.

In accordance with one aspect, a wireless communication system can utilize centralized resource scaling as illustrated by system 300, distributed resource scaling as illustrated by system 400, or a combination thereof to apportion system communication resources. In either scenario, it can be appreciated that resource scaling enables system resources to be utilized by respective APs according to their relative offered load, thereby ensuring inter-AP fairness and QoS assurance.

Referring to FIGS. 5-8, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 5:
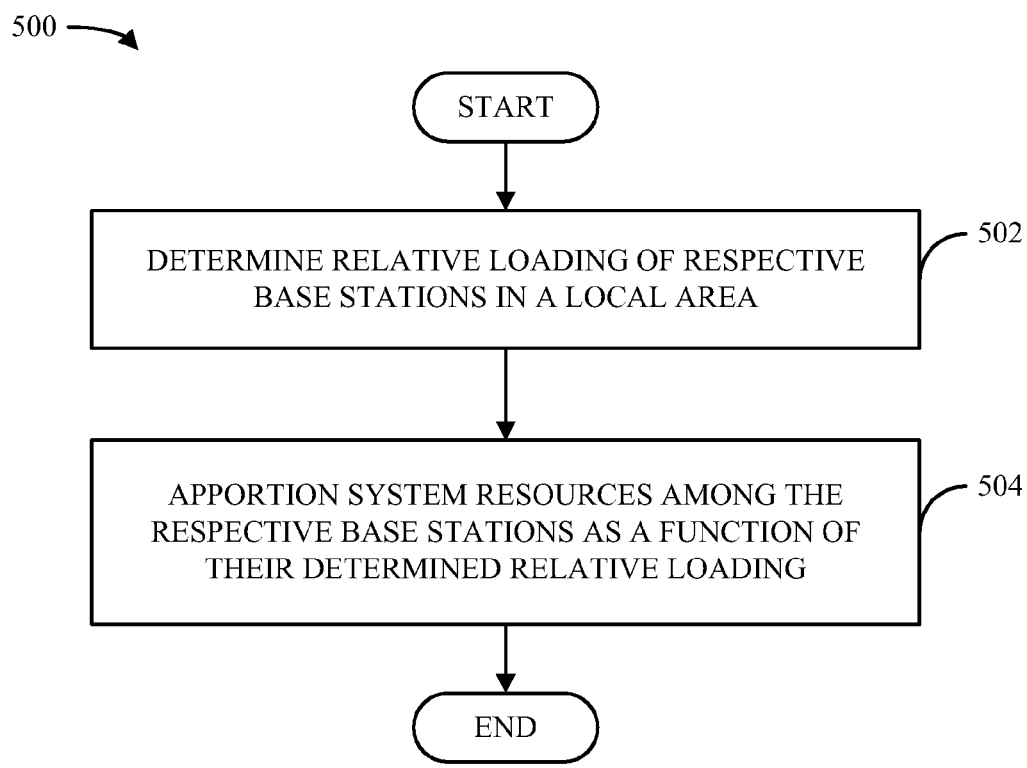
FIGS. 5-7 are flow diagrams of respective methods for apportioning communication resources among neighboring access points in a wireless communication system.

With reference to FIG. 5, illustrated is a methodology 500 for apportioning communication resources among neighboring access points (e.g., base stations 210) in a wireless communication system (e.g., system 200). It is to be appreciated that methodology 500 can be performed by, for example, an access point (e.g., base station 210), a system controller (e.g., resource controller 340), and/or any other appropriate network entity. Methodology 500 begins at block 502, wherein relative loading of respective base stations in a local area is determined. In one example, loading of a base station can be computed for the determination at block 502 based on various factors, such as the number of users (e.g., terminals 220) served by a base station, the number of high QoS flows associated with a base station, QoS parameters associated with respective users served by a base station, throughput per user, total data rate of a base station, and the like. In another example, relative loading can be determined by comparing the loading of respective base stations to one another, to an average or default loading parameter, and/or by any other suitable means. Methodology 500 can then continue to block 504, wherein system resources are apportioned among the respective base stations as a function of their determined relative loading. In one example, resource apportionment can be combined with frequency reuse functionality at block 504 to ensure that neighboring base stations do not use overlapping system resources.

Figure 6:
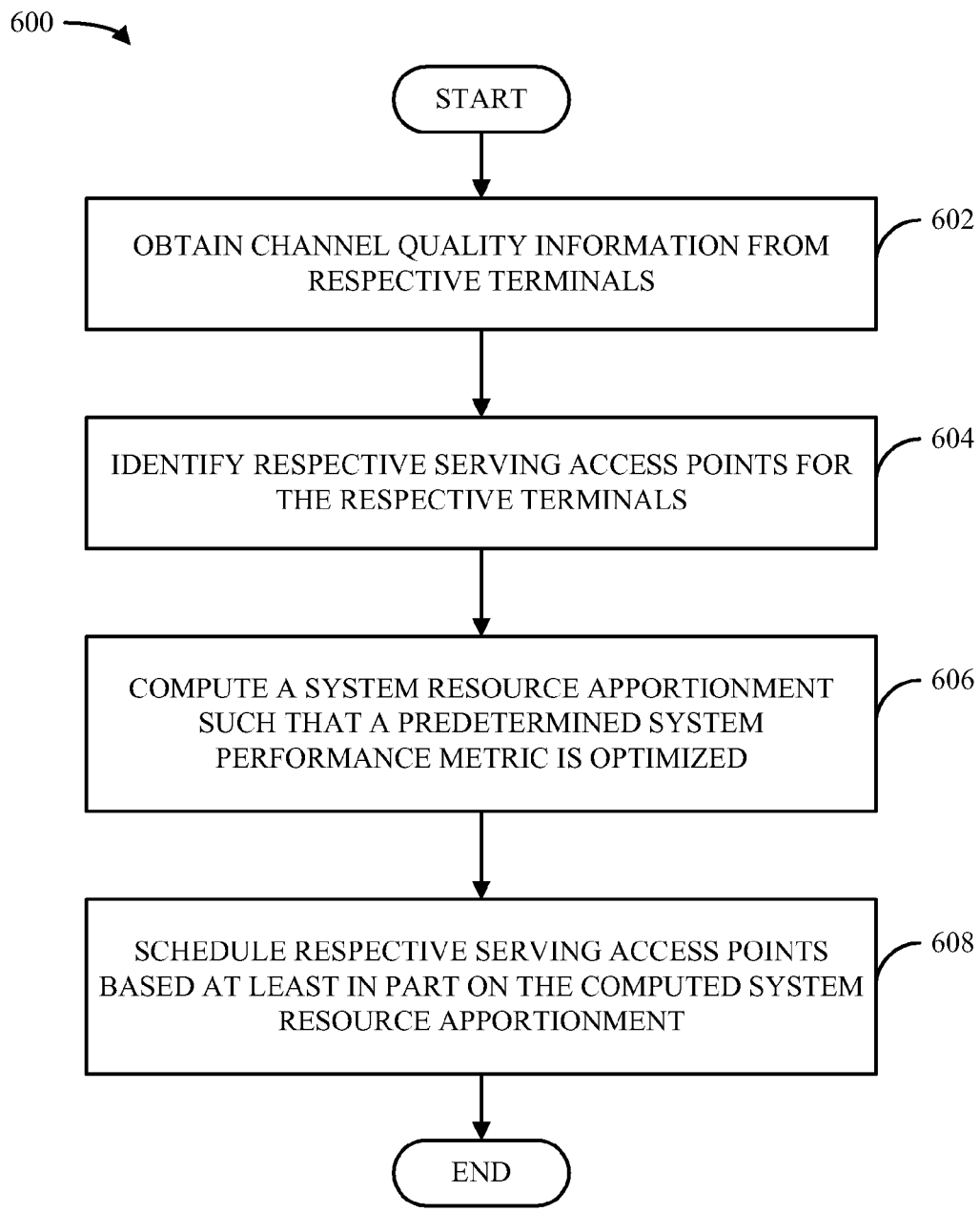

FIG. 6 illustrates a methodology 600 for apportioning system resources among respective access points based on a centralized scheduling mechanism. Methodology 600 can be performed by, for example, an access point (e.g., AP 310, 320, and/or 330), a system controller (e.g., resource controller 340), and/or any other appropriate network entity. Methodology 600 begins at block 602, wherein channel quality information is obtained from respective terminals (e.g., ATs 312). Next, at block 604, respective serving APs for the terminals from which channel quality information was obtained at block 602 are identified. In one example, the relative loading of the APs identified at block 604 can also be determined based on the channel quality information obtained at block 602 and/or data relating to the terminals served by the respective APs.

At block 606, a system resource apportionment is computed (e.g., by a resource optimizer 342) such that a predetermined system performance metric is optimized. The system performance metric utilized at block 606 can be, for example, total system throughput, median system throughput, tail or worst case system throughput, AP resource usage fairness, or the like. Methodology 600 can then conclude at block 608, wherein respective serving APs identified at block 604 are scheduled (e.g., by a resource scheduler 344) based at least in part on the system resource apportionment computed at block 606.

Figure 7:
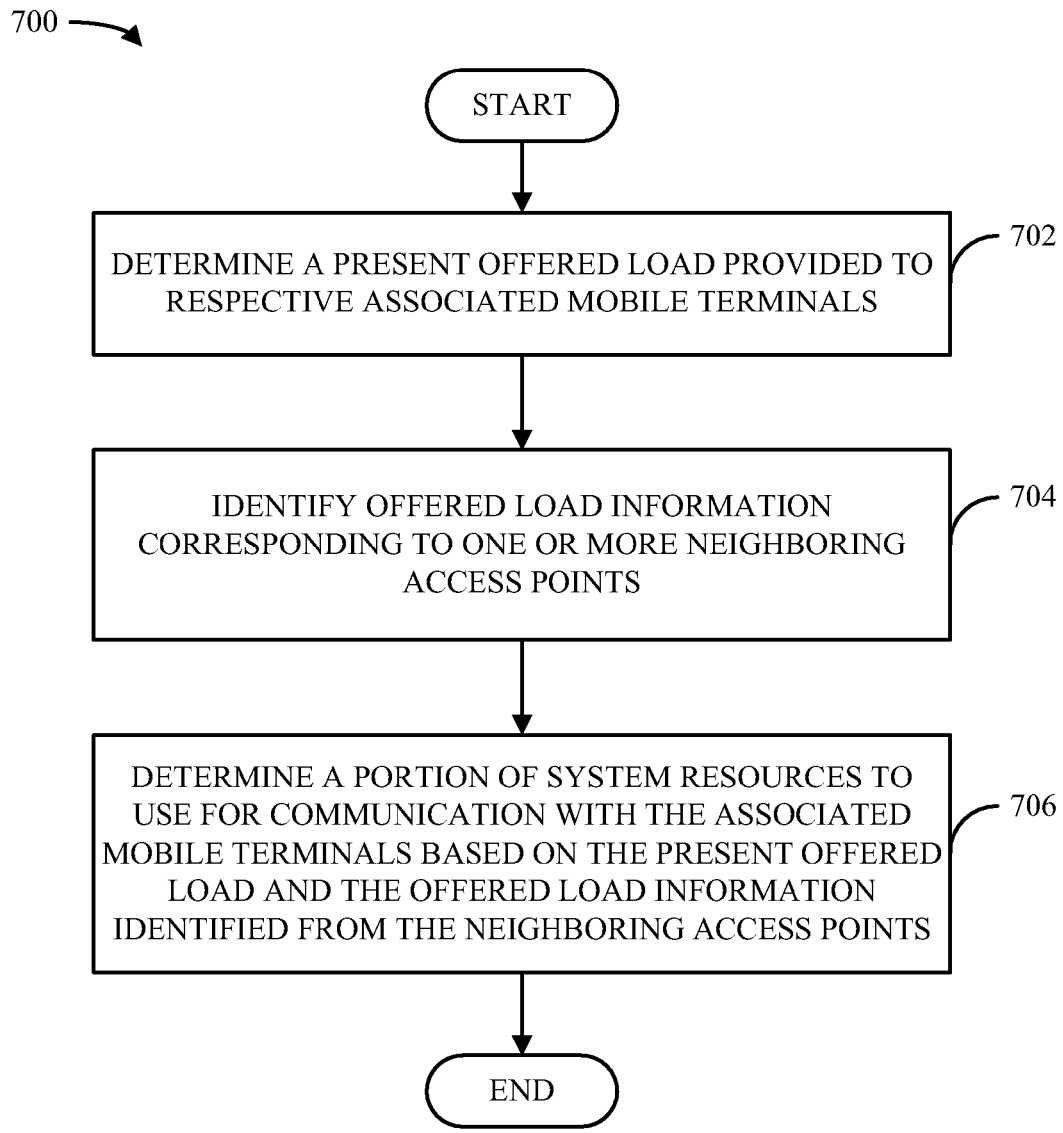

FIG. 7 illustrates a methodology 700 for apportioning system resources among respective access points based on a distributed scheduling mechanism. It is to be appreciated that methodology 700 can be performed by, for example, an access point (e.g., base station 410) and/or any other appropriate device. Methodology 700 begins at block 702, wherein a present offered load provided to respective associated mobile terminals (e.g., ATs 405) is determined. At block 704, offered load information corresponding to one or more neighboring access points is identified. Information identified at block 704 can be, for example, the offered load of respective access points, an average or default offered load parameter for a communication system and/or a local area thereof, and/or any other suitable information. Methodology 700 can then conclude at block 706, wherein a portion of system resources to use for communication with the associated mobile terminals is determined (e.g., by a resource scheduler 412) based on the present offered load determined at block 702 and the offered load information from the neighboring access points identified at block 704.

Figure 8:
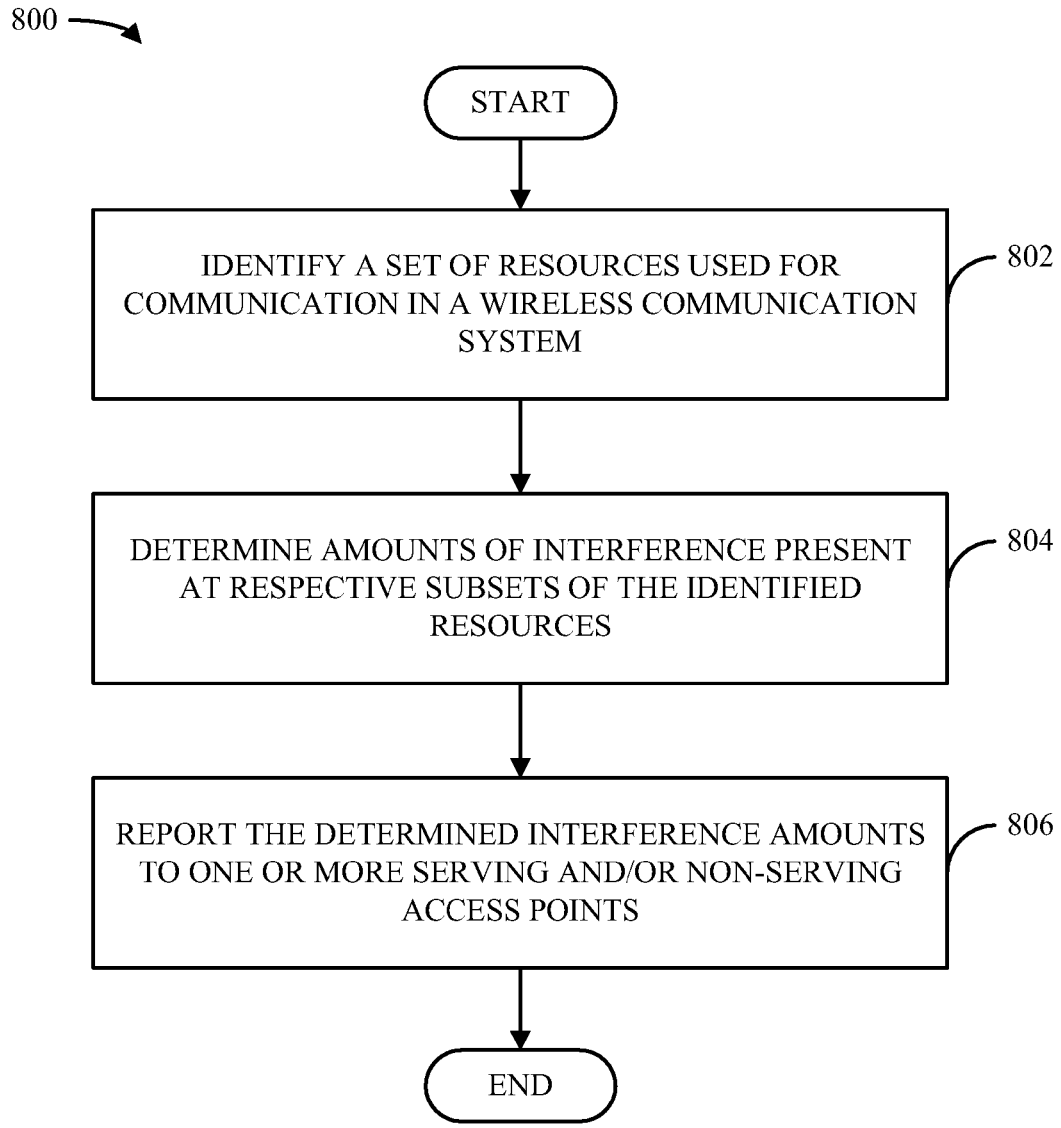
FIG. 8 is a flow diagram of a method for determining and reporting interference observed in a wireless communication system.

FIG. 8 is a flow diagram of a methodology 800 for determining and reporting interference observed in a wireless communication system. Methodology 800 can be performed by an access point, an access terminal, and/or any other suitable network entity. Methodology 800 begins at block 802, wherein a set of resources used for communication in a wireless communication system is identified. Next, at block 804, amounts of interference present at respective subsets of the resources identified at block 802 are determined. Methodology 800 then concludes at block 806, wherein the interference amounts determined at block 804 are reported to one or more serving and/or non-serving access points.

Figure 9:
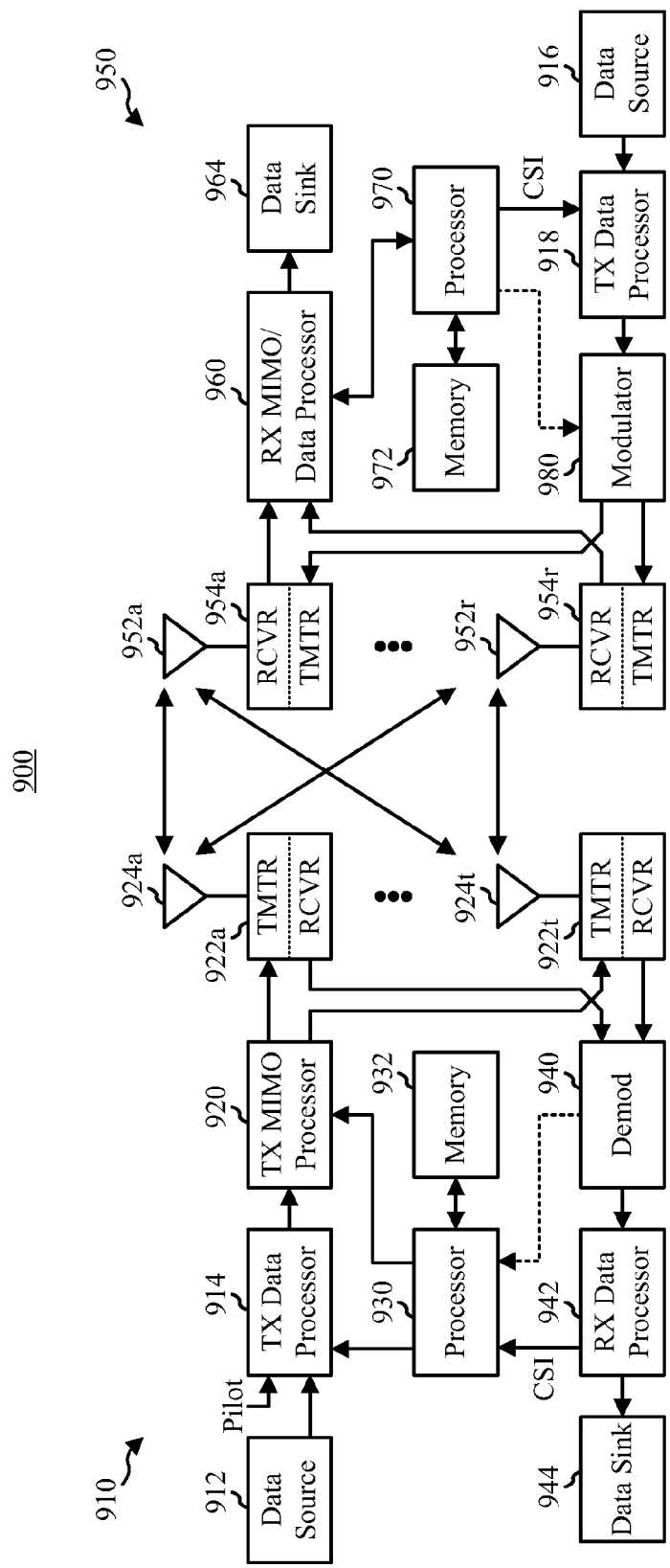
FIG. 9 is a block diagram illustrating an example wireless communication system in which various aspects described herein can function.

Referring now to FIG. 9, a block diagram illustrating an example wireless communication system 900 in which various aspects described herein can function is provided. In one example, system 900 is a multiple-input multiple-output (MIMO) system that includes a transmitter system 910 and a receiver system 950. It should be appreciated, however, that transmitter system 910 and/or receiver system 950 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 910 and/or receiver system 950 described herein could be utilized in connection with a single output to single input antenna system.

In accordance with one aspect, traffic data for a number of data streams are provided at transmitter system 910 from a data source 912 to a transmit (TX) data processor 914. In one example, each data stream can then be transmitted via a respective transmit antenna 924. Additionally, TX data processor 914 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 950 to estimate channel response. Back at transmitter system 910, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 930.

Next, modulation symbols for all data streams can be provided to a TX processor 920, which can further process the modulation symbols (e.g., for OFDM). TX MIMO processor 920 can then provides $N_T$ modulation symbol streams to $N_T$ transceivers 922a through 922t. In one example, each transceiver 922 can receive and process a respective symbol stream to provide one or more analog signals. Each transceiver 922 can then further condition (e.g., amplify, filter, and upconvert) the analog signals to provide a modulated signal suitable for transmission over a MIMO channel. Accordingly, $N_T$ modulated signals from transceivers 922a through 922t can then be transmitted from $N_T$ antennas 924a through 924t, respectively.

In accordance with another aspect, the transmitted modulated signals can be received at receiver system 950 by $N_R$ antennas 952a through 952r. The received signal from each antenna 952 can then be provided to respective transceivers 954. In one example, each transceiver 954 can condition (e.g., filter, amplify, and downconvert) a respective received signal, digitize the conditioned signal to provide samples, and then processes the samples to provide a corresponding "received" symbol stream. An RX MIMO/data processor 960 can then receive and process the $N_R$ received symbol streams from $N_R$ transceivers 954 based on a particular receiver processing technique to provide $N_T$ "detected" symbol streams. In one example, each detected symbol stream can include symbols that are estimates of the modulation symbols transmitted for the corresponding data stream. RX processor 960 can then process each symbol stream at least in part by demodulating, deinterleaving, and decoding each detected symbol stream to recover traffic data for a corresponding data stream. Thus, the processing by RX processor 960 can be complementary to that performed by TX MIMO processor 920 and TX data processor 914 at transmitter system 910. RX processor 960 can additionally provide processed symbol streams to a data sink 964.

In accordance with one aspect, the channel response estimate generated by RX processor 960 can be used to perform space/time processing at the receiver, adjust power levels, change modulation rates or schemes, and/or other appropriate actions. Additionally, RX processor 960 can further estimate channel characteristics such as, for example, signal-to-noise-and-interference ratios (SNRs) of the detected symbol streams. RX processor 960 can then provide estimated channel characteristics to a processor 970. In one example, RX processor 960 and/or processor 970 can further derive an estimate of the "operating" SNR for the system. Processor 970 can then provide channel state information (CSI), which can comprise information regarding the communication link and/or the received data stream. This information can include, for example, the operating SNR. The CSI can then be processed by a TX data processor 918, modulated by a modulator 980, conditioned by transceivers 954a through 954r, and transmitted back to transmitter system 910. In addition, a data source 916 at receiver system 950 can provide additional data to be processed by TX data processor 918.

Back at transmitter system 910, the modulated signals from receiver system 950 can then be received by antennas 924, conditioned by transceivers 922, demodulated by a demodulator 940, and processed by a RX data processor 942 to recover the CSI reported by receiver system 950. In one example, the reported CSI can then be provided to processor 930 and used to determine data rates as well as coding and modulation schemes to be used for one or more data streams. The determined coding and modulation schemes can then be provided to transceivers 922 for quantization and/or use in later transmissions to receiver system 950. Additionally and/or alternatively, the reported CSI can be used by processor 930 to generate various controls for TX data processor 914 and TX MIMO processor 920. In another example, CSI and/or other information processed by RX data processor 942 can be provided to a data sink 944.

In one example, processor 930 at transmitter system 910 and processor 970 at receiver system 950 direct operation at their respective systems. Additionally, memory 932 at transmitter system 910 and memory 972 at receiver system 950 can provide storage for program codes and data used by processors 930 and 970, respectively. Further, at receiver system 950, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

Figure 10:
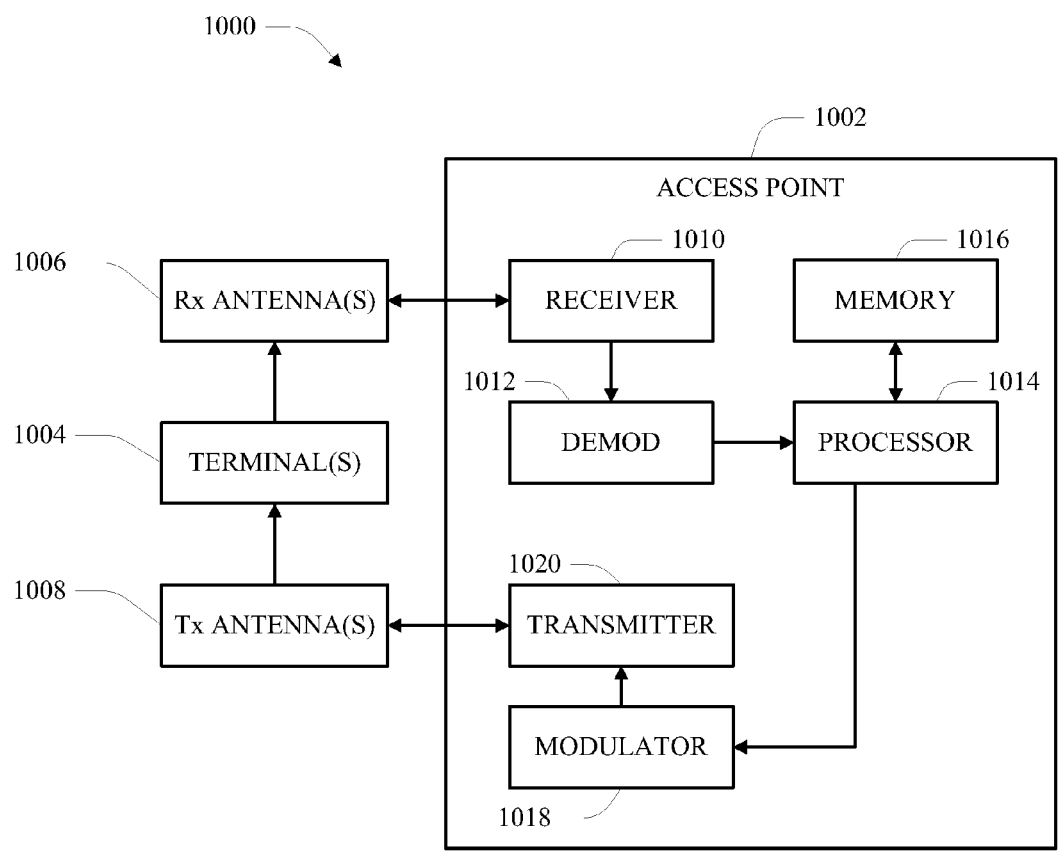
FIGS. 10-11 are block diagrams illustrating example wireless devices that are operable to implement various aspects described herein.

FIG. 10 is a block diagram of a system 1000 that facilitates management of a handoff operation in a wireless communication system in accordance with various aspects described herein. In one example, system 1000 includes a base station or access point 1002. As illustrated, access point 1002 can receive signal(s) from one or more terminals 1004 via one or more receive (Rx) antennas 1006 and transmit to the one or more terminals 1004 via one or more transmit (Tx) antennas 1008.

Additionally, access point 1002 can comprise a receiver 1010 that receives information from receive antenna(s) 1006. In one example, the receiver 1010 can be operatively associated with a demodulator (Demod) 1012 that demodulates received information. Demodulated symbols can then be analyzed by a processor 1014. Processor 1014 can be coupled to memory 1016, which can store information related to code clusters, access terminal assignments, lookup tables related thereto, unique scrambling sequences, and/or other suitable types of information. In one example, access point 1002 can employ processor 1014 to perform methodologies 500, 600, 700, and/or other similar and appropriate methodologies. Access point 1002 can also include a modulator 1018 that can multiplex a signal for transmission by a transmitter 1020 through transmit antenna(s) 1008.

Figure 11:
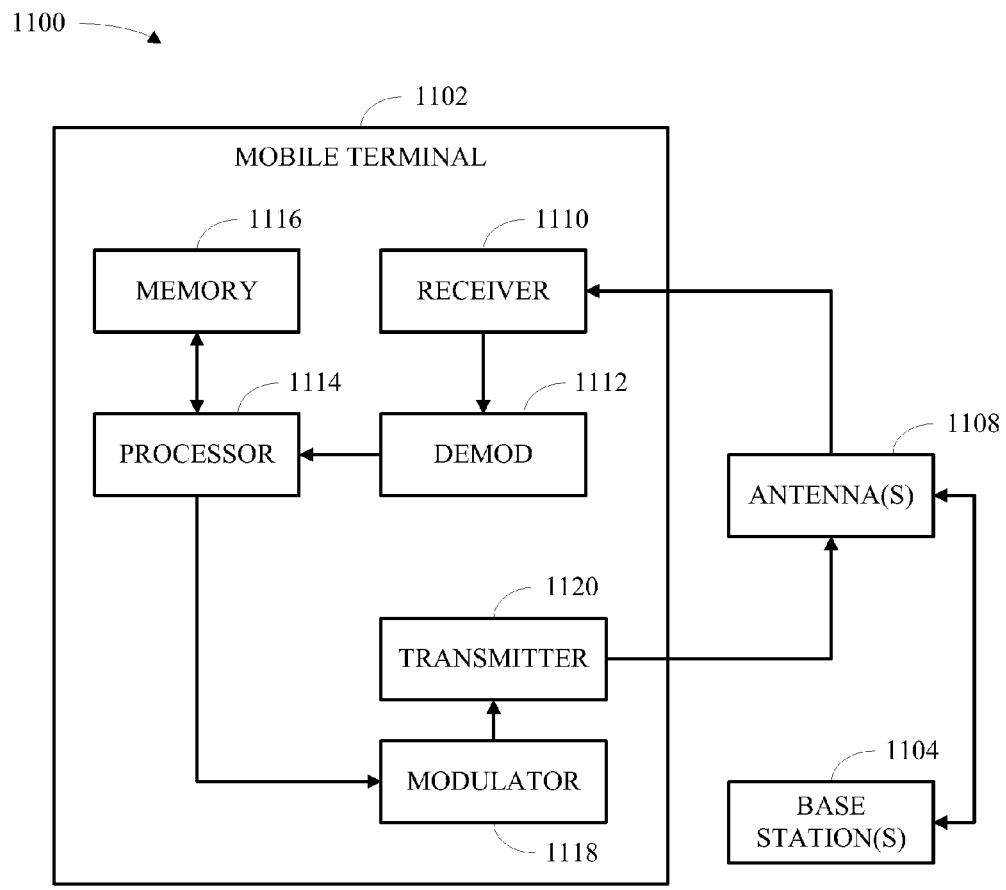

FIG. 11 is a block diagram of an additional system 1100 that facilitates management of a handover in a wireless communication system in accordance with various aspects described herein. In one example, system 1100 includes a mobile terminal 1102. As illustrated, mobile terminal 1102 can receive signal(s) from one or more base stations 1104 and transmit to the one or more base stations 1104 via one or more antennas 1108. Additionally, mobile terminal 1102 can comprise a receiver 1110 that receives information from antenna(s) 1108. In one example, receiver 1110 can be operatively associated with a demodulator (Demod) 1112 that demodulates received information. Demodulated symbols can then be analyzed by a processor 1114. Processor 1114 can be coupled to memory 1116, which can store data and/or program codes related to mobile terminal 1102. Additionally, mobile terminal 1102 can employ processor 1114 to perform methodology 900 and/or other similar and appropriate methodologies. Mobile terminal 1102 can also include a modulator 1118 that can multiplex a signal for transmission by a transmitter 1120 through antenna(s) 1108.

Figure 12:
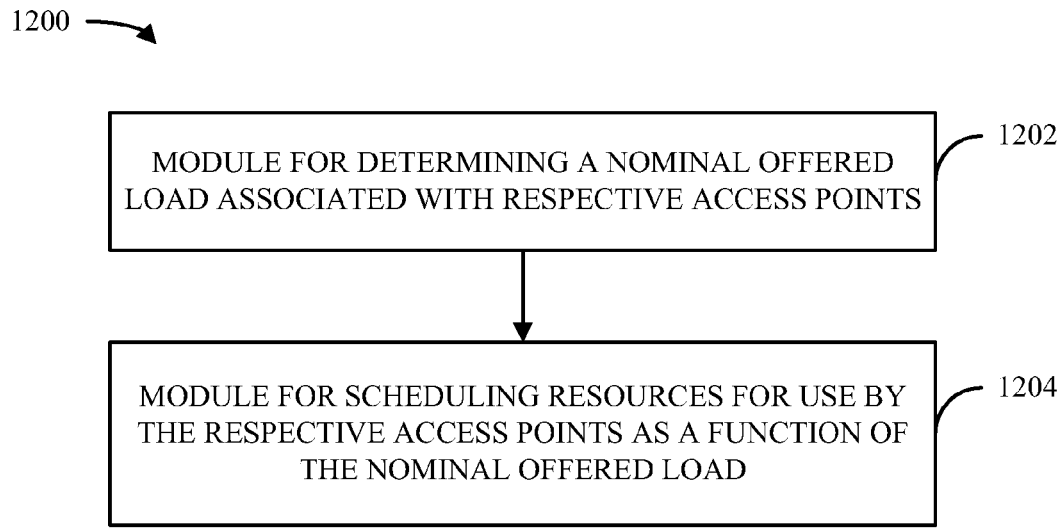
FIG. 12 is a block diagram of an apparatus that facilitates resource scaling for inter-access point fairness in a communication network.

FIG. 12 illustrates an apparatus 1200 that facilitates resource scaling for inter-access point fairness in a communication network (e.g., system 200). It is to be appreciated that apparatus 1200 is represented as including functional blocks, which can be functional blocks that represent functions implemented by a processor, software, or combination thereof (e.g., firmware). Apparatus 1200 can be implemented in an access point (e.g., base station 210), a system controller (e.g., resource controller 340), and/or any other network entity and can include a module 1202 for determining a nominal offered load associated with respective access points and a module 1204 for scheduling resources for use by the respective access points as a function of the nominal offered load.

Figure 13:
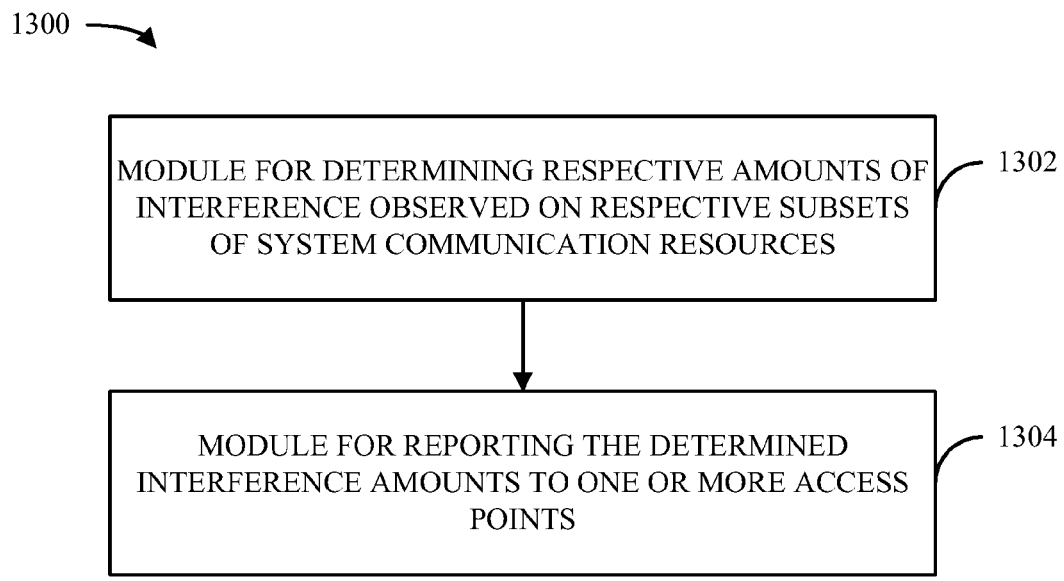
FIG. 13 is a block diagram of an apparatus that facilitates interference reporting in a communication network.

FIG. 13 illustrates an apparatus 1300 that facilitates interference reporting in a communication network. It is to be appreciated that apparatus 1300 is represented as including functional blocks, which can be functional blocks that represent functions implemented by a processor, software, or combination thereof (e.g., firmware). Apparatus 1300 can be implemented in an access terminal (e.g., terminal 220) and/or any other appropriate network entity and can include a module 1302 for determining respective amounts of interference observed on respective subsets of system communication resources and a module 1304 for reporting the determined interference amounts. In an embodiment, the reporting can be made to one or more access points.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for apportioning resources in a wireless communication system performed by an access point, the access point being in a set of access points, comprising:
receiving, by the access point, loading information directly from respective access points in the set of access points, wherein the access point provides an interface between one or more user terminals and a communication network;
determining, by the access point, relative loading of the respective access points in the set of access points based on the loading information received directly from the respective access points, the determining further based on identified information including access point capacity and available backhaul capacity of the set of access points, the available backhaul capacity comprising an available bandwidth to communicate with one or more access points in the set of access points; and
scaling, by the access point, resources used for communication with the one or more user terminals by at least one of the respective access points other than the access point for communication based on resources used by at least another one of the respective access points, wherein the scaling resources used for communication with the one or more user terminals by at least one of the respective access points other than the access point is a function of the determined relative loading of the respective access points that is based at least in part on the available backhaul capacity of the set of access points and an access point capacity of the at least one of the respective access points.

2. The method of claim 1, wherein the resources comprise one or more sets of orthogonal dimensions in at least one of time, frequency, code, or space.

3. The method of claim 1, wherein the resources comprise transmit power utilized by the at least one of the respective access points.

4. The method of claim 1, wherein the scaling comprises:
computing a resource apportionment for the at least one of the respective access points that optimizes system throughput; and
scaling the resources used by the at least one of the respective access points for communication according to the computed apportionment.

5. The method of claim 4, wherein:
the determining comprises communicating information relating to the relative loading of the respective access points via one or more backhaul messages; and
the scaling further comprises:
identifying a resource apportionment communicated in one or more subsequent backhaul messages; and
scaling the resources used by the at least one of the respective access points according to the identified apportionment.

6. The method of claim 4, wherein:
the determining comprises identifying information relating to the relative loading of the respective access points in a local area via one or more over-the-air messages; and
the computing a resource apportionment comprises computing an optimal resource apportionment based on the identified information.

7. The method of claim 6, wherein the determining further comprises receiving the one or more over-the-air messages from the one or more user terminals.

8. The method of claim 7, wherein the one or more over-the-air messages comprise an indication of respective amounts of interference observed by the one or more-user terminals on respective subsets of system communication resources.

9. The method of claim 1, wherein the scaling comprises:
identifying resources utilized by the respective access points in a local area for communication; and
selecting resources for communication that do not overlap the identified resources.

10. The method of claim 1, wherein loading of an access point is determined based on one or more of a number of users served by the access point, throughput of the access point, quality of service (QoS) flows associated with the access point, or an aggregated data rate reservation of the access point.

11. The method of claim 1, wherein the scaling comprises selecting a portion of overall system resources corresponding to an access point in proportion to loading of the access point in relation to nominal system loading.

12. The method of claim 11, wherein the nominal system loading is based at least in part on one or more of average system loading, median system loading, or the access point capacity of said at least one of the respective access points.

13. The method of claim 11, wherein the nominal system loading is based at least in part on one or more of average loading or median loading for a local area within the wireless communication system.

14. The method of claim 13, wherein the local area comprises one or more first-tier neighbor entities.

15. The method of claim 1, wherein the determining comprises:
obtaining channel quality information from one or more users; and
determining the relative loading of the respective access points based at least in part on the obtained channel quality information.

16. The method of claim 15, wherein the obtaining comprises obtaining information from one or more users relating to interference observed in respective sets of system resources.

17. A wireless communications apparatus, wherein the wireless communications apparatus is a base station, the base station being in a set of base stations, comprising:
a memory that stores data relating to offered loads of respective base stations in the set of base stations; and
a processor configured to provide an interface between one or more user terminals and a communication network, receive loading information directly from the respective base stations, determine the offered loads of the respective base stations based on the loading information received directly from the respective base stations, and based on identified information including base station capacity and available backhaul capacity of the set of base stations, and apportion resources for communication with the one or more user terminals utilized by at least one of the respective base stations other than the base station based on resources used by at least another one of the respective base stations, the resources apportioned for communication with the one or more user terminals utilized by at least one of the respective base stations other than the base station are apportioned by a resource scaling based at least in part on the offered loads of the respective base stations that is based at least in part on the available backhaul capacity of the set of base stations and on a base station capacity of the at least one of the respective base stations, the available backhaul capacity comprising an available bandwidth to communicate with one or more of the respective base stations in the set of base stations.

18. The wireless communications apparatus of claim 17, wherein the processor is further configured to apportion at least one of temporal dimensions, frequency dimensions, code dimensions, spatial dimensions, or power spectrum density (PSD).

19. The wireless communications apparatus of claim 17, wherein the processor is further configured to compute a resource scaling for the at least one of the respective base stations that optimizes system performance and to apportion the resources based on the computed resource scaling.

20. The wireless communications apparatus of claim 17, wherein the processor is further configured to communicate information relating to the offered load of the wireless communications apparatus via backhaul messages, to identify a resource scaling communicated in one or more subsequent backhaul messages, and to apportion resources utilized by the wireless communications apparatus according to the identified resource scaling.

21. The wireless communications apparatus of claim 17, wherein the memory further stores data relating to an offered load of the wireless communications apparatus and the processor is further configured to identify information relating to offered loads of respective local base stations via over-the-air messages and to apportion resources utilized by the wireless communications apparatus as a function of the offered load of the wireless communications apparatus in relation to the offered loads of the respective local base stations.

22. The wireless communications apparatus of claim 21, wherein the processor is further configured to receive the over-the-air messages from the one or more user terminals.

23. The wireless communications apparatus of claim 17, wherein the processor is further configured to apportion the resources utilized by the at least one of the respective base stations such that neighboring base stations do not utilize overlapping resources.

24. The wireless communications apparatus of claim 17, wherein the processor is further configured to determine an offered load of a second base station based on one or more of a number of user terminals served by the second base station, throughput of the second base station, quality of service (QoS) flows associated with the second base station, or an aggregated data rate reservation of the second base station.

25. The wireless communications apparatus of claim 17, wherein the processor is further configured to apportion resources utilized by a second base station based on a ratio of an offered load of the second base station to a nominal offered load.

26. The wireless communications apparatus of claim 25, wherein the processor is further configured to determine the nominal offered load based on one or more of average offered load, median offered load, or the base station capacity of said at least one of the respective base stations.

27. The wireless communications apparatus of claim 17, wherein the memory further stores data relating to the one or more user terminals and respective channel quality reports obtained therefrom and the processor is further configured to determine an offered load of at least one base station based at least in part on the channel quality reports.

28. The wireless communications apparatus of claim 27, wherein the channel quality reports comprise information relating to interference observed by respective user terminals at respective sets of system resources.

29. An apparatus that facilitates resource scaling in a wireless communication system, wherein the apparatus is an access point that provides an interface between one or more user terminals and a communication network, the access point being in a set of access points, comprising:

means for receiving loading information directly from respective access points in the set of access points;

means for determining a nominal offered load associated with the respective access points based on the loading information received directly from the respective access points and based on identified information including an access point capacity and available backhaul capacity of the set of access points, the available backhaul capacity comprising an available bandwidth to communicate with one or more access points in the set of access points; and means for scheduling resources, for communication with the one or more user terminals, for use by at least one of the respective access points other than the access point based on resources used by at least another one of the respective access points, wherein the scheduling resources for use by at least one of the respective access points other than the access point is a function of the nominal offered load associated with the respective access points that is based at least in part on the available backhaul capacity of the set of access points.

30. A non-transitory computer-readable medium of an access point, wherein the access point is in a set of access points and provides an interface between one or more user terminals and a communication network, comprising:

code for receiving loading information directly from respective access points in the set of access points;

code for determining a nominal offered load associated with the respective access points based on the loading information received directly from the respective access points and based on identified information including an access point capacity and available backhaul capacity of the set of access points, the available backhaul capacity comprising an available bandwidth to communicate with one or more access points in the set of access points; and code for scaling resources for communication with the one or more user terminals utilized by at least one of the respective access points other than the access point based on resources utilized by at least another one of the respective access points, wherein the scaling resources for communication with the one or more user terminals utilized by the at least one of the respective access points other than the access point is a function of the nominal offered load associated with the respective access points that is based at least in part on the available backhaul capacity of the set of access points.

31. An integrated circuit that executes computer-executable instructions for enforcing fair use of resources in a wireless communication network, the instructions comprising:

receiving, by a base station, loading information directly from respective base stations in a set of base stations, wherein the base station provides an interface between one or more user terminals and the wireless communication network;

identifying, by the base station, a nominal loading factor associated with the respective base stations based on the loading information received directly from the respective base stations, the identifying further being based on identified information including a base station capacity and available backhaul capacity of the set of base stations, the available backhaul capacity comprising an available bandwidth to communicate with one or more base stations in the set of base stations; and constraining, by the base station, communication with the one or more user terminals by at least one of the respective base stations other than the base station to a subset of resources utilized by the respective base stations, wherein the communication with the one or more user terminals by at least one of the respective base stations other than the base station is constrained to the subset of resources based on resources utilized by at least another one of the respective base stations and the available backhaul capacity of the set of access points, and wherein a size of the subset is based on the nominal loading factor associated with the respective base stations.

32. The method of claim 1, wherein the identified information further includes channel resource usage, and the scaling includes computing an optimal resource apportionment based on the identified information.

* * * * *